United States Patent Office 3,064,757
Patented Nov. 20, 1962

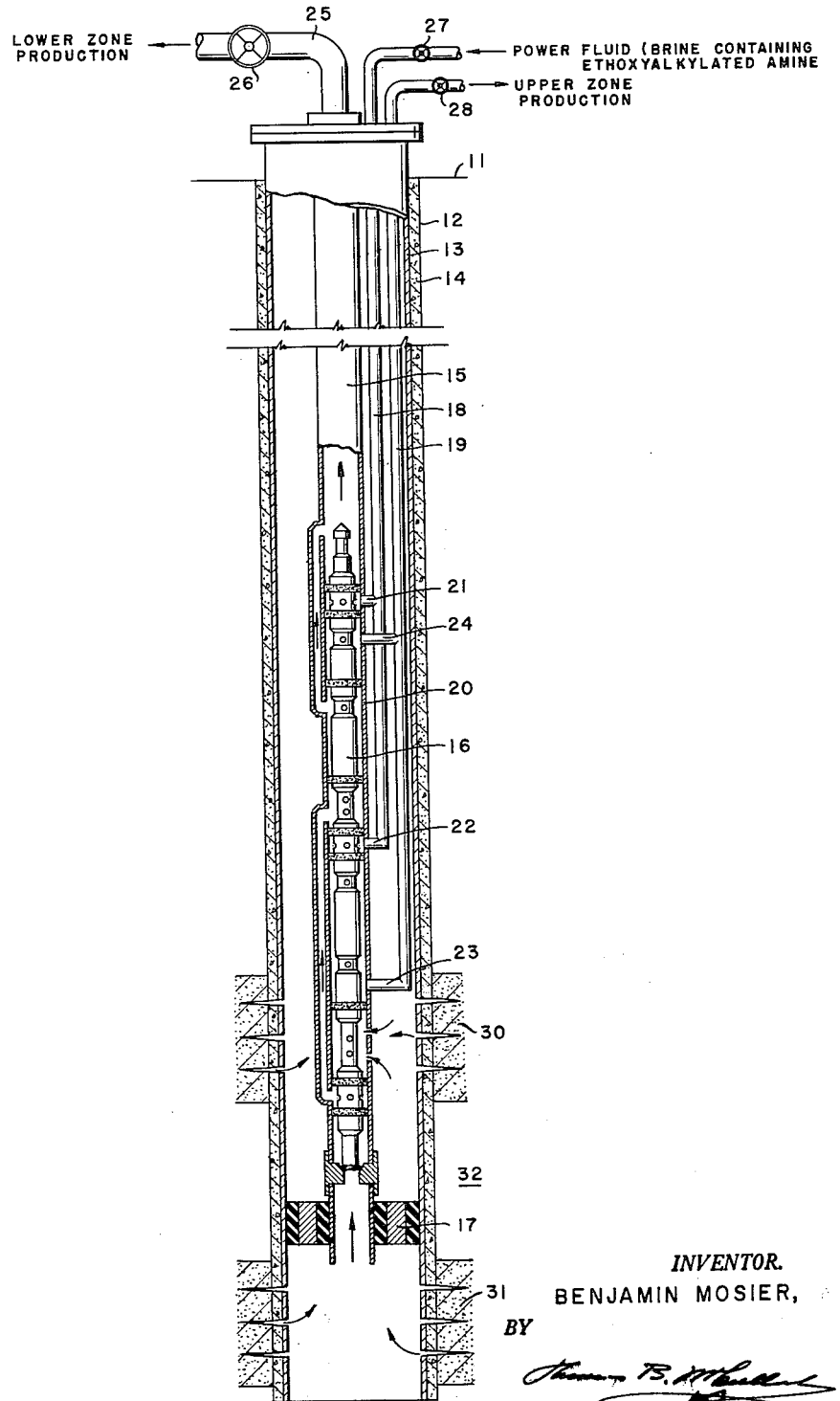

3,064,757
LUBRICATION OF METALLIC SURFACES
Benjamin Mosier, Houston, Tex., assignor, by mesne assignments, to Jersey Production Research Company, Tulsa, Okla., a corporation of Delaware
Filed Nov. 10, 1960, Ser. No. 68,573
12 Claims. (Cl. 184—1)

The present invention is directed to a method of lubricating metallic surfaces. More particularly, the invention is concerned with the lubrication of metallic surfaces which are moving relative to each other. In its more specific aspects, the invention is concerned with the lubrication of metallic surfaces in subsurface well pumps.

The present invention may be briefly described as a method for lubricating two metallic surfaces in contact with each other, one of said surfaces moving relative to another of these surfaces, in which an aqueous solution containing from about 0.006 to about 0.05 percent by volume of ethoxylated fatty amine is flowed over the metallic surfaces whereby loss of metal from the surfaces is reduced and the surfaces are lubricated.

The aqueous solution may be fresh water or any aqueous solution such as brine as illustrated by sea water or brine which is produced from a subsurface earth formation. When brine is the aqueous solution, it may suitably contain from about 2 to about 10 percent by weight of salts. Particularly, the salts may be sodium chloride, magnesium chloride or calcium carbonate, calcium chloride, various other salts usually associated with brine, and the other aqueous solutions may be used.

The ethoxylated fatty amine employed in the practice of the present invention is a tallow or coco diamine containing ethylene oxide. The tallow amine is suitably composed of about 2 percent of $C_{14}$ fatty acid salt, 24 percent of $C_{16}$ fatty acid salt, 28 percent of $C_{18}$ fatty acid salt, and about 46 percent of the $C_{18}$ unsaturated fatty acid salt. The coco salt is suitably composed of about 8 percent of the $C_8$ fatty acid salt, about 9 percent of the $C_{10}$ fatty acid salt, 47 percent of the $C_{12}$ fatty acid salt, 18 percent of the $C_{14}$ fatty acid salt, 8 percent of the $C_{16}$ fatty acid salt, 5 percent of the $C_{18}$ fatty acid salt, and 5 percent of the $C_{18}$ unsaturated fatty acid salt.

The tallow and coco diamine may contain from about 3 to about 30 mols of ethylene oxide per mol of the tallow or coco diamine. Satisfactory results are obtained with the oxyalkylated fatty amines containing from about 3 to about 15 mols of ethylene oxide per mol of the tallow or coco diamine.

The present invention is particularly suitable for use as a power fluid in hydraulic subsurface well pumps. Heretofore crude oil has been used as the power fluid to operate subsurface hydraulic pumps. However, it is expensive to use crude oil for this purpose and a substantial saving may be effected in accordance with the present invention in which either fresh or salt water, such as brine, is substituted for the crude oil. However, aqueous solutions such as fresh or salt water are unsatisfactory because the metallic surfaces which are in contact with the aqueous fluid may be corroded or improperly lubricated. It has now been discovered that, in accordance with the present invention, either fresh or salt water may be used as a power fluid in operating subsurface hydraulic pumps. It has been discovered that the ethoxylated fatty amines such as the tallow and coco diamines may be used in small amounts in aqueous solution and the aqueous solution then employed as a power fluid or as a lubricant.

The present invention will be further illustrated by reference to the drawing in which the single FIGURE is a view of a well containing a hydraulically operated pump.

Referring now to the drawing, numeral 11 designates the earth surface from which a well 12 has been drilled to penetrate subsurface earth formations or zones 30 and 31 which are separated from each other by other formations illustrated by the numeral 32. The formations 30 and 31 contain valuable earth fluids such as hydrocarbons, either gaseous or liquid, or other valuable fluids. Arranged in the well 12 is a casing 13 suitably cemented in place by cement 14 in which a tubing string 15 is set. The tubing string 15 extends below the formation 30 and the annulus between the tubing string 15 and the casing 13 is closed between the formations 30 and 31 by a packing means illustrated by the numeral 17.

Connecting to tubing 15 are conduits 18 and 19, the conduits 18 and 19 serving to conduct fluid to and from a dual hydraulic pump 16 arranged in a mandrel 20 which forms a part of the tubing string 15. The conduit 18 connects into the mandrel 20 by branch conduits 21 and 22. The conduit 19 connects into the mandrel 20 by branch conduits 23 and 24. The conduit 19 serves to discharge upper zone production from the tubing 15 and the conduit 18 supplies power fluid to the pump contained in the mandrel 20. The lower zone production is discharged by conduit 25 controlled by valve 26. Valves 27 and 28 control conduits 18 and 19, respectively.

Arranged in the mandrel 20 is a suitable hydraulic pump 16 which may be a subsurface hydraulic pump such as shown in the Composite Catalog of Oil Field and Pipe Line Equipment, published by the Gulf Publishing Company, of Houston, Texas, in the 17th (1950) edition, at page 2674 to page 2684, inclusive. While the pump shown in the Composite Catalog, supra, may be used, other pumps of a hydraulic nature may also be employed. There are many hydraulic pumps on the market and, ordinarily, these pumps involve a power piston and a pump piston movable in piston cylinders, the power piston being actuated by power fluids from the earth surface either introduced to the tubing string or to a separate conduit as shown in the drawing. In any event, in accordance with the present invention, the aqueous solution containing the ethoxylated fatty amine is used as the power fluid and to lubricate the moving parts of the piston and piston cylinder which supplies power to the unit.

In accordance with the present invention, the hydraulic pump 16 in mandrel 20 is lubricated and supplied with power by a solution of brine which contains ethoxylated fatty amine.

A commercial operation was conducted in which a subsurface pump has been supplied with power using as the power fluid salt water containing 0.04 percent by volume of ethoxylated fatty amine. The volumetric efficiency of the subsurface pump while using the salt water solution containing the ethoxylated fatty amine has remained at 87 percent after approximately 12,000 barrels of salt water containing the ethoxylated fatty amine has been used. In other words, the present invention has been shown to be of commercial utility.

In order to illustrate the present invention further, ethoxylated fatty amines have been added in various concentrations to salt water obtained from a crude petroleum field. These ethoxylated fatty amines were employed in comparison with other agents and were tested to determine the efficacy thereof as follows: 300 cc. of field salt water are shaken with the desired concentration of the additive until solution or dispersion has been effected. An extreme pressure mud tester such as the Baroid E.P. Tester is then used to test the salt water containing the added chemicals. The operation of the tester involves the mounting of a machined steel ring on the shaft of a D.C. motor and a test block of steel is placed on a torquemeter. A vessel containing the salt water and lubricant is then mounted in such a manner that the test block and ring are in contact with the fluid. The ring is rotated at a constant speed of 1725 r.p.m. and a given torque of 5 inch-pounds to 200 inch-pounds applied for a period of time of about 5 minutes. The loss in weight (wear reduction) of the test piece is measured at each applied torque until the block galls.

The results of several tests are shown in Table I.

TABLE I

*Wear Reduction Properties of Some Water Dispersion*

| | Weight Loss (mg.) in 5 Minutes at Applied Torque | | | | | | |
|---|---|---|---|---|---|---|---|
| Torque (in. lbs.) | 10 | 20 | 40 | 60 | 80 | 100 | 200 |
| Composition: | | | | | | | |
| (1) 0.02% Ethoduomeen T/13 | 0.5 | 0.1 | 0.4 | 0.1 | 0.4 | 0.3 | 0.7. |
| (2) 0.02% Ethoduomeen T/13 (150° F.) | 0.6 | 0.4 | 0.7 | 0.3 | 0.1 | 0.4 | |
| (3) 0.008% Ethoduomeen T/13 | | 0.4 | 0.1 | 0.2 | 0.5 | 0.5 | |
| (4) 0.02% Ethoduomeen T/20 | | 0.2 | 0.3 | 0.1 | 0.1 | 0.2 | 0.4. |
| (5) 0.02% Ethoduomeen T/25 | | <0.1 | <0.1 | 0.3 | 0.2 | 0.2 | 4.2. |
| (6) 0.006% Ethoduomeen T/25 | | <0.1 | 0.2 | 0.3 | 0.1 | 0.1 | 0.1 (120 in. lbs.) |
| (7) 0.02% Ethoduomeen T/40 | | 0.1 | 0.2 | 0.1 | 3.8 | | |
| (8) Crude Oil | | 0.1 | 0.1 | 0.3 | 0.2 | 0.2 | (Fails at 160 in. lbs.) |
| (9) Lubricating Oil (SAE-30) | | <0.1 | 0.2 | 0.2 | | | |
| (10) Corexit 730 (0.1%) | 0.1 | 0.4 | 0.3 | Fails | | | |
| (11) 0.125% Graphite—0.125% Kembreak | 0.1 | 0.2 | 0.6 | | | | |
| (12) Duomeen T (0.02%) | | 0.3 | 0.2 | 0.1 | 3.7 | | |
| (13) Tall Oil—15 moles Ethylene Oxide (0.02%) | | 0.1 | 0.3 | 0.1 | 8.4 | | |
| (14) Ethofat (0.02%) | | 0.3 | 0.1 | 0.2 | 0.6 | Fails | |
| (15) Arneel C (0.02%) | | 0.3 | 1.1 | | | | |
| (16) Salt Water (Field) | | 0.1 | 0.2 | 0.7 | 5.6 | | |

It will be seen from these results that the several Ethoduomeens satisfactorily performed as lubricants when employed in salt water dispersion. These compounds may be compared to crude oil and the lubricating oil which ordinarily have been used. It will be noted that the salt water contains various concentrations of the Ethoduomeens performed satisfactorily. On the other hand, from Table I it will be seen that other compounds were unsatisfacory.

Ethoduomeen is an ethoxyalkylated N-fatty substituted trimethylene diamine with the numeral T/13, indicating that this is a tallow amine and that the mols of ethylene oxide may be determined by subtracting 10 from the number such as T/13. In other words, Ethoduomeen T/13 contains 3 mols of ethylene oxide per mol of diamine, whereas Ethoduomeen T/25 contains 15 mols of ethylene oxide per mol of diamine.

By way of explanation, the Ethoduomeens will be dissolved or dispersed in the aqueous solutions. Thus, the Ethoduomeens containing the smaller amounts of ethylene oxide will be dispersed in the aqueous solutions while the Ethoduomeens containing the large amounts in the range of 10 to 30 mols of ethylene oxide are dissolved in the aqueous solutions.

"Corexit 730" is a trade name for a corrosion inhibitor which is a reaction product of VR–I acids, which are known to the trade and which are degradation products of sebacic acid, and diethylenetriamine. "Kembreak" is a trade name for sodium lignosulfonate and "Duomeen T" is a trade name for a tallow diamine. Likewise, "Ethofat" and "Arneel C" are trade names for ethoxylated fatty acid and distilled coco nitrile.

From the foregoing description and the several examples, it will be clear that the present invention is quite important and useful in that heretofore it had not been known that aqueous solutions such as fresh or salt water containing a small amount of ethoxylated fatty amines could be used to lubricate moving metallic surfaces or as a power fluid in pumping of wells using a subsurface hydraulic pump. The present invention is therefore quite important and useful.

The nature and objects of the present invention having been completely described and illustrated, what I wish to claim as new and useful and secure by Letters Patent is:

1. A method for lubricating two metallic surfaces in contact with each other, one of said surfaces moving relative to the other of said surfaces, which comprises flowing an aqueous solution containing from about 0.006 percent to about 0.05 percent by volume of ethoxylated fatty amine containing from about to about 30 mols of ethylene oxide per mol of amine, said amine being selected from the group consisting of N-tallow substituted trimethylene diamine and N-coco substituted trimethylene diamine over said surfaces whereby loss of metal from said surfaces is reduced and said surfaces are lubricated.

2. A method in accordance with claim 1 in which the aqueous solution is brine.

3. A method in accordance with claim 2 in which the brine is produced from a subsurface earth formation.

4. A method in accordance with claim 2 in which the brine is sea water.

5. A method for lubricating two metallic surfaces in contact with each other, one of said surfaces moving relative to the other of said surfaces, which comprises flowing water containing from about 0.006 percent to about 0.05 percent by volume of soluble ethoxylated fatty amine containing from about 3 to about 30 mols of ethylene oxide per mol of amine, said amine being selected from the group consisting of N-tallow substituted trimethylene diamine and N-coco substituted trimethylene diamine over said surfaces whereby loss of metal from said surfaces is reduced and said surfaces are lubricated.

6. A method for lubricating two metallic surfaces in contact with each other, one of said surfaces moving relative to the other of said surfaces, which comprises flowing water containing from about 0.006 percent to about 0.05 percent by volume of dispersible ethoxylated fatty amine containing from about 3 to about 30 mols of ethylene oxide per mol of amine, said amine being selected from the group consisting of N-tallow substituted trimethylene diamine and N-coco substituted trimethylene diamine over said surfaces whereby loss of metal from said surfaces is reduced and said surfaces are lubricated.

7. A method for lubricating two metallic surfaces in contact with each other, one of said surfaces moving relative to the other of said surfaces, which comprises flowing an aqueous salt solution containing from about 0.006 percent to about 0.05 percent by volume of ethoxylated fatty amine containing from about 3 to about 30 mols of ethylene oxide per mol of amine, said amine being selected from the group consisting of N-tallow substituted trimethylene diamine and N-coco substituted trimethylene diamine over said surfaces whereby loss of metal from said surfaces is reduced and said surfaces are lubricated.

8. In a method for pumping fluid from a subsurface earth formation in which a subsurface hydraulic pump is actuated by hydraulic fluid pumped from the earth's surface, the improvement which comprises supplying water containing from about 0.006 percent to about 0.05 percent by volume of ethoxyalkylated fatty amine containing from about 3 to about 30 mols of ethylene oxide per mol of amine, said amine being selected from the group consisting of N-tallow substituted trimethylene diamine and N-coco substituted trimethylene diamine to said pump as hydraulic fluid whereby the interior surfaces of said pump are lubricated and loss of metal therefrom is minimized.

9. A method in accordance with claim 8 in which the water is brine.

10. In a method for pumping fluid from a subsurface earth formation in which a subsurface hydraulic pump is actuated by hydraulic fluid pumped from the earth's surface, the improvement which comprises supplying brine produced from a subsurface earth formation containing from about 0.006 percent to about 0.05 percent by volume of soluble ethoxyalkylated fatty amine containing from about 3 to about 30 mols of ethylene oxide per mol of amine, said amine being selected from the group consisting of N-tallow substituted trimethylene diamine and N-coco substituted trimethylene diamine to said pump as hydraulic fluid whereby the interior surfaces of said pump are lubricated and loss of metal therefrom is minimized.

11. In a method for pumping fluid from a subsurface earth formation in which a subsurface hydraulic pump is actuated by hydraulic fluid pumped from the earth's surface, the improvement which comprises supplying brine produced from a subsurface earth formation containing from about 0.006 percent to about 0.05 percent by volume of dispersible ethoxyalkylated fatty amine containing from about 3 to about 30 mols of ethylene oxide per mol of amine, said amine being selected from the group consisting of N-tallow substituted trimethylene diamine and N-coco substituted trimethylene diamine to said pump as hydraulic fluid whereby the interior surfaces of said pump are lubricated and loss of metal therefrom is minimized.

12. In a method for pumping fluid from a subsurface earth formation in which a subsurface hydraulic pump is actuated by hydraulic fluid pumped from the earth's surface, the improvement which comprises supplying an aqueous salt solution containing from about 0.006 percent to about 0.05 percent by volume of ethoxyalkylated fatty amine containing from about 3 to about 30 mols of ethylene oxide per mol of amine, said amine being selected from the group consisting of N-tallow substituted trimethylene diamine and N-coco substituted trimethylene diamine to said pump as hydraulic fluid whereby the interior surfaces of said pump are lubricated and loss of metal therefrom is minimized.

References Cited in the file of this patent

UNITED STATES PATENTS

| | | |
|---|---|---|
| 2,917,160 | Turinsky | Dec. 15, 1959 |
| 2,925,781 | Fischer | Feb. 23, 1960 |